US008436558B2

(12) United States Patent
Holmberg et al.

(10) Patent No.: US 8,436,558 B2

(45) Date of Patent: May 7, 2013

(54) MOORING WINCH AND A METHOD FOR CONTROLLING A CABLE OF A MOORING WINCH

(75) Inventors: Mikael Holmberg, Porvoo (FI); Vassili Jung, Espoo (FI)

(73) Assignee: ABB Oy, Helsinki (FI)

( * ) Notice: Subject to any disclaimer, the term of this patent is extended or adjusted under 35 U.S.C. 154(b) by 193 days.

(21) Appl. No.: 13/103,382

(22) Filed: May 9, 2011

(65) Prior Publication Data

US 2011/0271891 A1 Nov. 10, 2011

(30) Foreign Application Priority Data

May 7, 2010 (EP) ..................................... 10162339

(51) Int. Cl.
*H02P 6/12* (2006.01)

(52) U.S. Cl.
USPC ............... 318/6; 318/809; 318/810; 318/488; 318/460; 318/362; 318/432; 318/436; 254/277; 254/267; 254/268; 254/274; 254/276; 242/410; 702/41; 440/34; 114/213

(58) Field of Classification Search .............. 318/6, 809, 318/810, 488, 460, 362, 432, 436; 254/277, 254/267, 268, 274, 276; 242/410; 702/41; 440/34; 114/213

See application file for complete search history.

(56) References Cited

U.S. PATENT DOCUMENTS

| | | | | |
|---|---|---|---|---|
| 4,048,547 | A * | 9/1977 | Havard et al. | 318/488 |
| 4,272,706 | A * | 6/1981 | Somerville | 318/6 |
| 4,334,217 | A * | 6/1982 | Nield et al. | 340/685 |
| 4,752,012 | A * | 6/1988 | Juergens | 212/278 |
| 6,594,592 | B1 * | 7/2003 | Griepentrog et al. | 702/41 |
| 6,653,804 | B1 * | 11/2003 | Kureck | 318/3 |
| 7,586,286 | B2 * | 9/2009 | Cheng et al. | 318/807 |

FOREIGN PATENT DOCUMENTS

EP 0676365 A2 10/1995

* cited by examiner

*Primary Examiner* — Rita Leykin

(74) *Attorney, Agent, or Firm* — Buchanan Ingersoll & Rooney PC

(57) ABSTRACT

An electrically driven mooring winch is provided. The mooring winch includes a winding drum, an AC motor configured to drive the winding drum, a frequency conversion unit connected to the AC motor, and a control unit configured to control the frequency conversion unit on the basis of an indicator for tension of the mooring rope. The control unit is configured to set a reference value of rotational speed of the AC motor to a predetermined value, drive the AC motor in one direction for a predetermined time interval, define a first value of a torque of the AC motor, drive the AC motor in an opposite direction for the predetermined interval, define a second value of the torque of the AC motor, and compute a torque estimate using the first and second values of the torque.

17 Claims, 3 Drawing Sheets

MOORING WINCH AND A METHOD FOR CONTROLLING A CABLE OF A MOORING WINCH

RELATED APPLICATION

This application claims priority under 35 U.S.C. §119 to European Patent Application No. 10162339.5 filed in Europe on May 7, 2010, the entire content of which is hereby incorporated by reference in its entirety.

FIELD

The present disclosure relates to a method for controlling the mooring rope tension of a mooring winch. Furthermore, the present disclosure relates to a mooring winch and to a computer program for controlling the mooring rope tension of a mooring winch.

BACKGROUND INFORMATION

When a ship is moored alongside a wharf or a quay in a harbor, mooring ropes anchoring the ship must be properly tensioned so as to hold the ship in an appropriate position. If no effort is made to maintain the mooring ropes in correct tension, a hazardous situation might arise for the reason that the mooring ropes will become subjected to greater forces due to the tendency of the ship to move relative to the wharf or quay. There are a number of factors that may make the ship move relative to the wharf or quay. These factors can include, for example, variations of the level of water surface due to the cyclic tidal changes, and variations of the displacement of the ship due to cargo loading and/or unloading. These factors will cause the ship to vary its altitude with respect to the wharf or quay, and hence will vary the tension of the mooring ropes of a given length between the ship and the wharf or quay. Furthermore, the ship might be rocked or rolled by waves or wind to induce a fluctuating tension in the mooring ropes. In a situation in which such movements have great amplitudes, the mooring ropes might fail, resulting in a danger to personnel in the area of the ship and a risk of damage to the ship. The tension of the rope or the torque of the rope is either measured or computed on the basis of other measured variables. It is possible to measure the speed of the motor, the torque of the motor or the torque of the winding drum or the tension of the rope.

EP0676365 discloses a winch having at least one winding drum that is connected to an electrical drive via a gearbox. The electrical drive is an asynchronous alternating current (AC) motor connected to a speed control device and fitted with a brake device. The speed control has a speed indicator for detecting an existing rotational speed. The speed control device is coordinated by a control unit which may be, for example, a programmable controller taking the detected rotational speed and a target value of the rotational speed as inputs.

According to EP0676365, the starting point is important to the control of the winch, since the measured or computed value of the torque is not known for the control system. For instance, the measured value does not give an exact value of the tension of the rope and the torque required on the shaft of the motor and their correlations, because there are gearbox and other losses between the motor shaft and the rope.

Further, the speed indicator or the rope tension indicator is susceptible to hard weather conditions especially when the winch is being used as machinery on an open deck of a ship.

SUMMARY

An exemplary embodiment of the present disclosure provides a mooring winch which includes a winding drum configured to wind a mooring rope, a brake, and an AC motor configured to drive the winding drum. The exemplary mooring winch also includes a frequency conversion unit configured to supply electrical power to the AC motor, and a control unit configured to control the frequency conversion unit based on an indicator for tension of the mooring rope. The control unit is configured to set a reference value of rotational speed of the AC motor to a predetermined value, release the brake of the mooring winch, drive the AC motor in one direction for a predetermined time interval, define a first value of a torque of the AC motor, drive the AC motor in an opposite direction for the predetermined interval, define a second value of the torque of the AC motor, and compute a torque estimate using the first and second values of the torque.

An exemplary embodiment of the present disclosure provides a method for controlling the mooring rope tension of a mooring winch, which includes a brake, a winding drum for winding a mooring rope, an AC motor configured to drive the winding drum, and a frequency conversion unit configured to supply electrical power to the AC motor. The exemplary method includes controlling the frequency conversion unit based on an indicator for tension of the mooring rope, setting a reference value of rotational speed of the AC motor to a predetermined value, and releasing the brake of the mooring winch. In addition, the exemplary method includes driving the AC motor in one direction for a predetermined time interval, defining a first value of a torque of the AC motor, and driving the AC motor in an opposite direction for another predetermined time interval. Furthermore, the exemplary method includes defining a second value of the torque of the motor, and computing a torque estimate using the first and second values of the torque.

An exemplary embodiment of the present disclosure provides a non-transitory computer-readable recording medium having a computer program recorded thereon that causes a processor of a computing device to control the mooring rope tension of a mooring winch. The mooring winch includes a break, a winding drum for winding a mooring rope, an AC motor configured to drive the winding drum, and a frequency conversion unit configured to supply electrical power to the AC motor. The computer program causes the processor of the computing device to execute operations comprising: controlling the frequency conversion unit based on an indicator for tension of the mooring rope; setting a reference value of rotational speed of the AC motor to a predetermined value; releasing the brake of the mooring winch; driving the AC motor in one direction for a predetermined time interval; defining a first value of a torque of the AC motor; driving the AC motor in an opposite direction for the predetermined interval; defining a second value of the torque of the AC motor; and computing a torque estimate using the first and second values of the torque.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
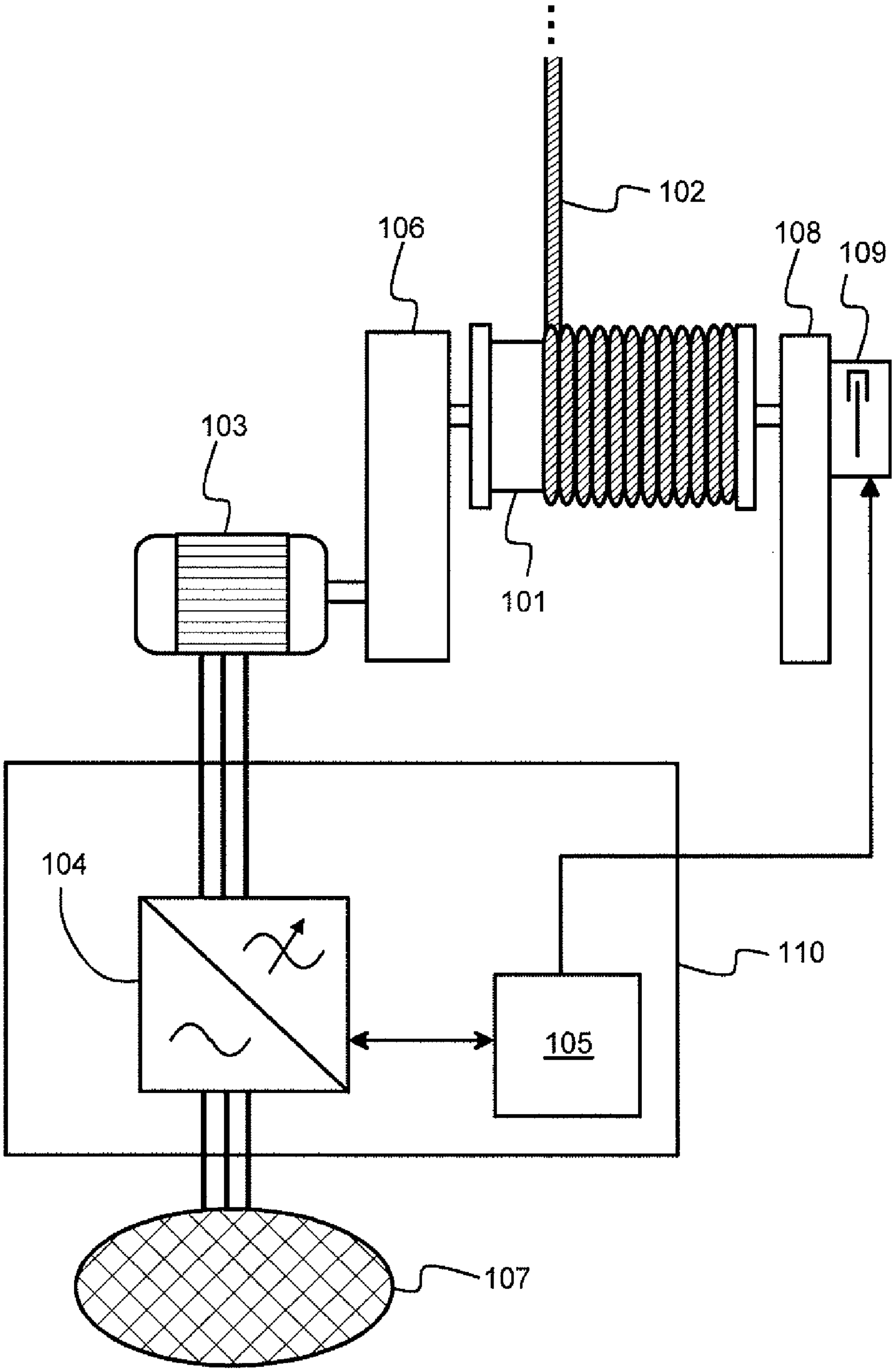
FIG. 1 shows a mooring winch according to an exemplary embodiment of the present disclosure.

An exemplary embodiment of the present disclosure provides a mooring winch which includes a winding drum for winding a mooring rope, an alternating current (AC) motor configured to drive the winding drum, a frequency conversion unit configured to supply electrical power to the AC motor, and a control unit configured to control the frequency conversion unit on the basis of an indicator for tension of the mooring rope. The control unit is configured to set a reference value of rotational speed of the AC motor to a predetermined value, to release a brake of the mooring winch, to drive the AC motor in one direction for a predetermined time interval, and to define a first value of a torque of the motor. In addition, the control unit is configured to drive the AC motor in an opposite direction for the predetermined interval, to define a second value of the torque of the motor, and to compute a torque estimate using the first and second values of the torque.

The gearbox and other possible losses will be eliminated when defining the torque estimate for the rope tension.

An exemplary embodiment of the present disclosure provides a method for controlling the mooring rope tension of a mooring winch. The mooring winch includes a winding drum for winding a mooring rope, an AC motor configured to drive the winding drum, and a frequency conversion unit configured to supply electrical power to the AC motor. The exemplary method includes controlling the frequency conversion unit on the basis of an indicator for tension of the mooring rope. The exemplary method also includes setting a reference value of rotational speed of the AC motor to a predetermined value, releasing a brake of the mooring winch, driving the AC motor in one direction for a predetermined time interval, and defining a first value of a torque of the AC motor. In addition, the exemplary method includes driving the AC motor in an opposite direction for another predetermined time interval, defining a second value of the torque of the AC motor, and computing a torque estimate using the first and second values of the torque.

An exemplary embodiment of the present disclosure provides a computer-readable recording medium having a computer program recorded thereon for controlling the mooring rope tension of a mooring winch, where the mooring winch includes a winding drum for winding a mooring rope, an AC motor configured to drive the winding drum, and a frequency conversion unit configured to supply electrical power to the AC motor. The computer program comprises computer executable instructions for making a programmable processor control the frequency conversion unit on the basis of an indicator for tension of the mooring rope. Furthermore, the computer program further comprises computer executable instructions for making the programmable processor: set a reference value of rotational speed of the AC motor to a predetermined value; release a brake of the mooring winch; drive the AC motor in one direction for a predetermined time interval; define a first value of a torque of the AC motor; drive the AC motor in an opposite direction for the predetermined interval; define a second value of the torque of the AC motor; and compute a torque estimate using the first and the second value of the torque.

Various exemplary embodiments of the present disclosure, which are directed to both constructions and methods of operation, together with additional objects and advantages thereof, will be best understood from the following description of specific exemplary embodiments when read in connection with the accompanying drawings.

FIG. 1 shows a mooring winch according to an exemplary embodiment of the present disclosure. The mooring winch includes a winding drum 101 for winding a mooring rope 102, and an alternating current (AC) motor 103 configured to drive the winding drum 101. The AC motor 103 can be, for example, an induction motor or a permanent magnet synchronous motor. The mooring winch shown in FIG. 1 has a gearbox 106 between the AC motor 103 and the winding drum 101. A brake 109 is configured in connection with the mooring winch to effect the winding drum 101. The winding drum 101 is supported with the gearbox 106 and a bearing block 108. Depending on the dimensioning of the AC motor 103 and the dimensioning of the winding drum 101, it is also possible to have a directly driven winding drum 101 so that there is no need for a gearbox 106. The mooring winch includes a frequency conversion unit 104 configured to supply electrical power to the AC motor 103. The frequency conversion unit 104 is connected to an electrical supply network 107 that can be, for example, an electrical network of a ship. The mooring winch also includes a control unit 105 configured to control the frequency conversion unit 104 on the basis of an indicator for tension [kN] of the mooring rope 102. According to an exemplary embodiment, the AC motor 103 can be driven in a speed controlled mode in such a manner that maximum mooring rope tension that can be created with the speed control is limited in order to avoid hazardous situations. According to an exemplary embodiment, the control unit 105 can constitute a speed controller for realizing the speed control of the AC motor 103. It is also possible to use a separate device configured to constitute a speed controller. The control unit 105 is configured to compute a flux space vector $\Psi$ for modelling a stator flux of the AC motor 103, and to compute a torque estimate $M_{est}$ on the basis of the flux space vector and a space vector i of stator currents of the AC motor 103. The torque estimate can be computed as:

$$M_{est}=\Psi\times i, \qquad (1)$$

where "x" means the vector product (i.e. cross product). The control unit 105 is configured to use the torque estimate as the indicator for the tension of the mooring rope. Hence, the mooring rope tension is being kept within allowed limits by keeping the torque estimate within allowed limits. The AC motor 103 can be controlled with a sensorless vector control, e.g., with vector control in which there is no speed and/or position indicator on the shaft of the AC motor 103. The sensorless vector control can be, for example, the open-loop direct torque control (DTC) in which the space vector v of the voltage supplied to the terminals of the AC motor 103 is controlled in such a manner that the estimated torque $M_{est}$ and the amplitude of the flux space vector $|\Psi|$ are between desired limits.

The frequency conversion unit 104 and the control unit 105 can be separate devices or, alternatively, they can be parts of a frequency converter 110.

In a mooring winch according to an exemplary embodiment of the present disclosure, the control unit 105 is configured to carry out the following actions for starting an automatic mooring operation:

to set a reference value of rotational speed of the AC motor 103 to a pre-determined value, to release a brake of the mooring winch, to drive the AC motor 103 in one direction for a predetermined time interval, to define a first value of a torque of the AC motor 103, to drive the AC motor 103 in an opposite direction for the predetermined interval, to define a second value of the torque of the AC motor 103, and to compute a torque estimate using the first and the second values of the torque.

Figure 2:
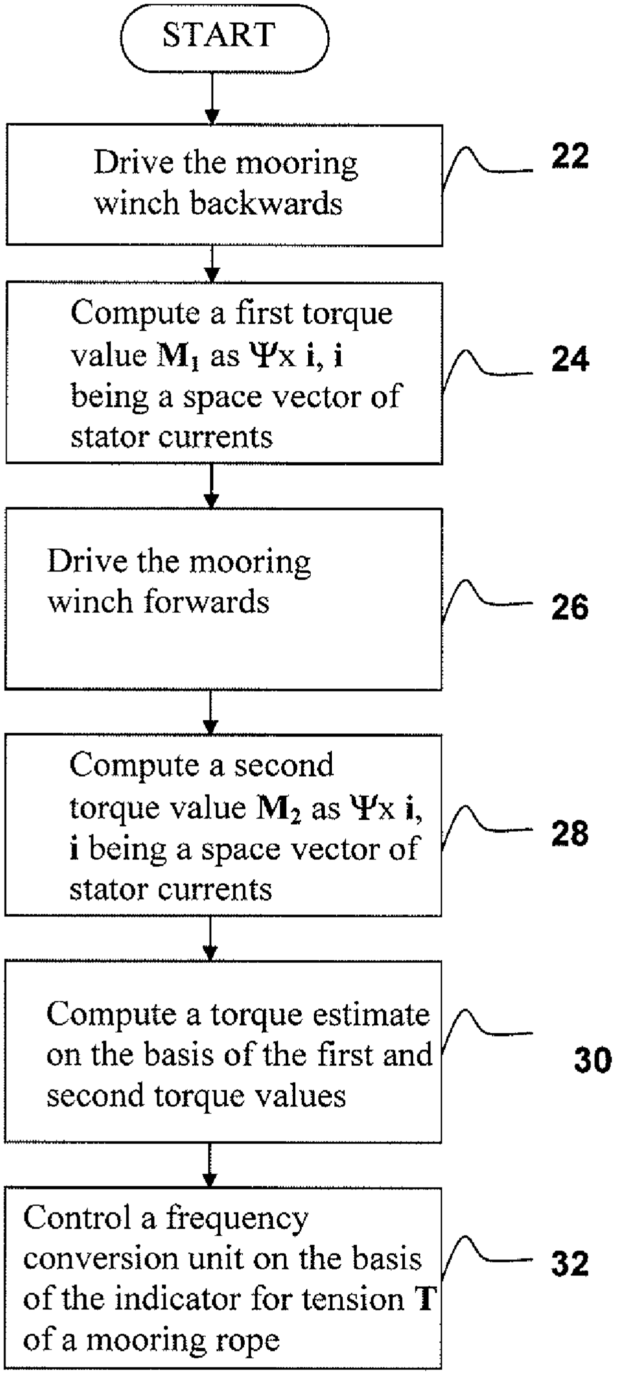
FIG. 2 shows a flow chart of a method according to an exemplary embodiment of the present disclosure for controlling mooring rope tension of a mooring winch.

FIG. 2 is a flow chart of a method according to an exemplary embodiment of the present disclosure for controlling the mooring rope tension of a mooring winch. The method comprises:

In phase 22, the mooring winch is driven backwards. A predetermined speed reference value is set and the AC motor 103 is driven backwards for a short time interval.

In phase 24, during the backwards drive, a first torque value is computed $M_1$ as Ψ×i, i being a space vector of stator currents.

In phase 26, the mooring winch is driven forwards. A predetermined speed reference value is set and the motor 103 is driven backwards for a short time interval. According to an exemplary embodiment, the speed reference value and the short time interval can be the same as in phase 22, but they can also differ from them.

In phase 28, during the forwards drive, a second torque value is computed $M_2$ as Ψ×i, i being a space vector of stator currents.

In phase 30, a torque estimate is computed on the basis of the first and second torque values. The torque estimate may be computed as an average of the first and the second torque values. It is also possible to compute the torque estimate as a weighted average.

In phase 32, the frequency conversion unit 104 is controlled on the basis of the indicator for tension T of a mooring rope. The control unit 105 compares the indicator for tension T of a mooring rope to the user set value. On the basis of the comparison, the control unit 105 chooses if the mooring drum 101 is driven in or out.

The pre-determined set value of torque is an upper limit for the target value of the torque produced by the AC motor 103. If the first value of the torque estimate is significantly higher than the pre-determined set value, the mooring rope is too tight and the mooring rope shall be wound out. Correspondingly, if the first value of the torque estimate is significantly lower than the predetermined set value, the mooring rope is too slack and the mooring rope shall be wound in. It is also undesirable that the mooring rope is too slack since a slack mooring rope allows harmful mechanical movements.

In a mooring winch according to an exemplary embodiment of the present disclosure, the control unit 105 is configured to carry out the following successive phases for accomplishing a periodical mooring operation. A method according to a corresponding embodiment of the present disclosure includes the following successive phases for accomplishing a periodical mooring operation:

Starting the periodical mooring operation.

The mooring winch is driven backwards. A predetermined speed reference value is set and the motor 103 is driven backwards for a short time interval.

During the backwards drive, a first torque value is computed $M_1$ as Ψ×i, where i is a space vector of stator currents.

The mooring winch is driven forwards. A predetermined speed reference value is set, and the motor 103 is driven backwards for a short time interval. The speed reference value and the short time interval can be the same as in phase 22 as described above, but they can also differ from them.

A second torque value is computed $M_2$ as Ψ×I for the forward drive, where i is a space vector of stator currents.

A torque estimate is computed on the basis of the first and second torque values.

Conditional phase A: controlling the AC motor 103 to wind the mooring rope 102 in as a response to a situation in which the computed torque estimate is lower than a first limit value, Conditional phase B: controlling the AC motor 103 to wind the mooring rope 102 out as a response to a situation in which the computed torque estimate is higher than a second limit value, Phase C: waiting a predetermined time interval, Re-starting the periodical mooring operation procedure.

The above-mentioned second limit value is greater than or equal to the above-mentioned first limit value, i.e. H+≧H−.

According to an exemplary embodiment of the present disclosure, a method for accomplishing a periodical mooring operation includes similar successive phases to those discussed above.

In accordance with another exemplary embodiment of the present disclosure, the control unit 105 of the mooring winch is configured to keep the AC motor 103 continuously energized and controlled in order to provide a continuous mooring operation.

In a method according to another exemplary embodiment of the present disclosure, the AC motor 103 is continuously energized and controlled in order to provide a continuous mooring operation.

The periodical mooring operation saves energy as compared to the continuous mooring operation because, in the periodical mooring operation, the AC motor 103 is de-energized for a significant portion of time.

A mooring winch according to an exemplary embodiment of the present disclosure includes a control interface for enabling selection between the above-described periodical mooring operation and the continuous mooring operation.

There are different ways to realize the brake 109 of the mooring winch. For example, the brake 109 can be arranged as depicted in FIG. 1. Alternatively, the brake can be integrated with the motor 103, or the brake can be integrated with the gearbox 106, or there can be a brake in conjunction with more than one of the following: the motor, the gearbox, and the bearing block 108. The brake can be, for example, a disc brake or a drum brake.

FIG. **3*a* illustrates an operation of mooring winches according to exemplary embodiments of the disclosure in exemplifying situations. The curve 221 represents the torque estimate, and the curve 222 represents a speed reference of the AC motor 103. It should be noted that the speed reference 222 coincides with the time-axis during time intervals t0 . . . t1 and t2 . . . t3. Here, the term "speed reference" means the reference value of the rotational speed of the AC motor 103 (FIG. 1**). The reference value of the rotational speed is not necessarily constant but it can vary over time.

Figure 3A:
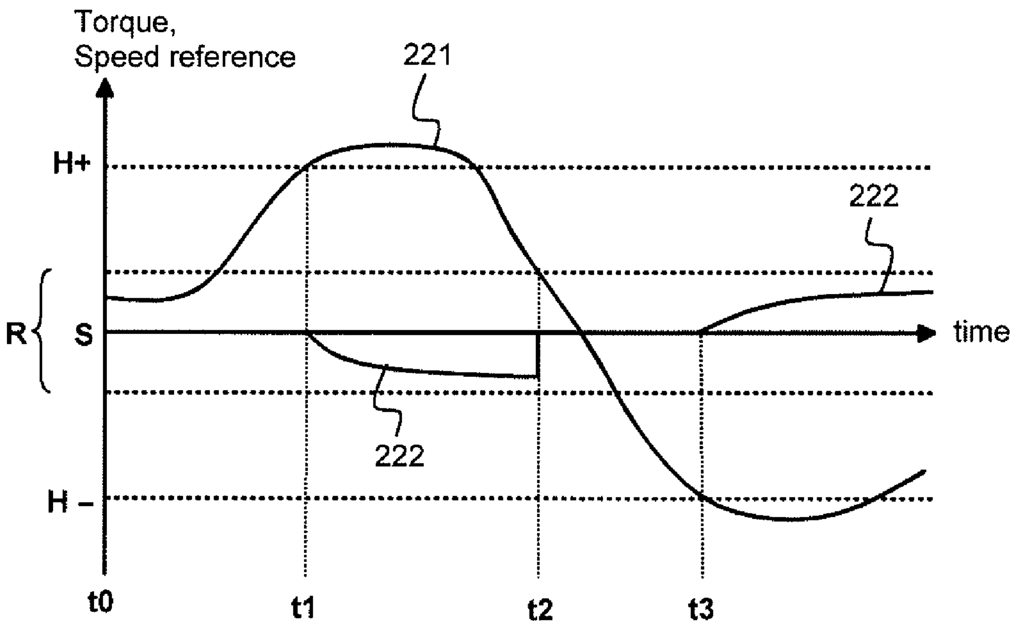
FIGS. 3*a* and 3*b* illustrate an operation of mooring winches according to exemplary embodiments of the disclosure in exemplifying situations.

In a mooring winch according to an exemplary embodiment of the disclosure, the control unit 105 (FIG. 1) is configured to make the AC motor 103 (FIG. 1) wind the mooring rope 102 (FIG. 1) in as a response to a situation in which the torque estimate 221 goes below a first pre-determined hysteresis limit value H−, and make the AC motor 103 wind the mooring rope out as a response to a situation in which the torque estimate exceeds a second pre-determined hysteresis limit value H+. The second pre-determined hysteresis limit value H+ is greater than the first pre-determined hysteresis limit value H−. As used herein, the sign of the rotational speed of the AC motor 103 is chosen in such a manner that the mooring rope is wound in, i.e. the mooring rope tension is increased, when the AC motor has a positive direction of rotation. Hence, the mooring rope can be wound in by making the speed reference 222 positive and the mooring rope can be wound out by making the speed reference 222 negative. In the exemplifying situation shown in FIG. 3*a*, the torque estimate exceeds the hysteresis limit value H+ at the time instant t1 and thus the speed reference 222 is made negative in order to reduce the mooring rope tension. At the time instant t3, the torque estimate goes below the hysteresis limit value H− and thus the speed reference is made positive in order to increase the mooring rope tension.

In a mooring winch according to an exemplary embodiment of the present disclosure, the control unit 105 (FIG. 1) is configured to set the speed reference 222 to zero as a response to a situation in which the torque estimate 221 is within a pre-determined range R. The pre-determined range R is around a pre-determined set value S of torque. The pre-determined set value S can be an upper limit for a target value of torque, the target value of torque being, for example, an output of a speed controller and being able to vary over time. In the exemplifying situation shown in FIG. 3*a*, the estimated torque 221 gets into the pre-determined range R at the time instant t2 and thus the speed reference 222 is set to zero at the time instant t2.

Figure 3B:
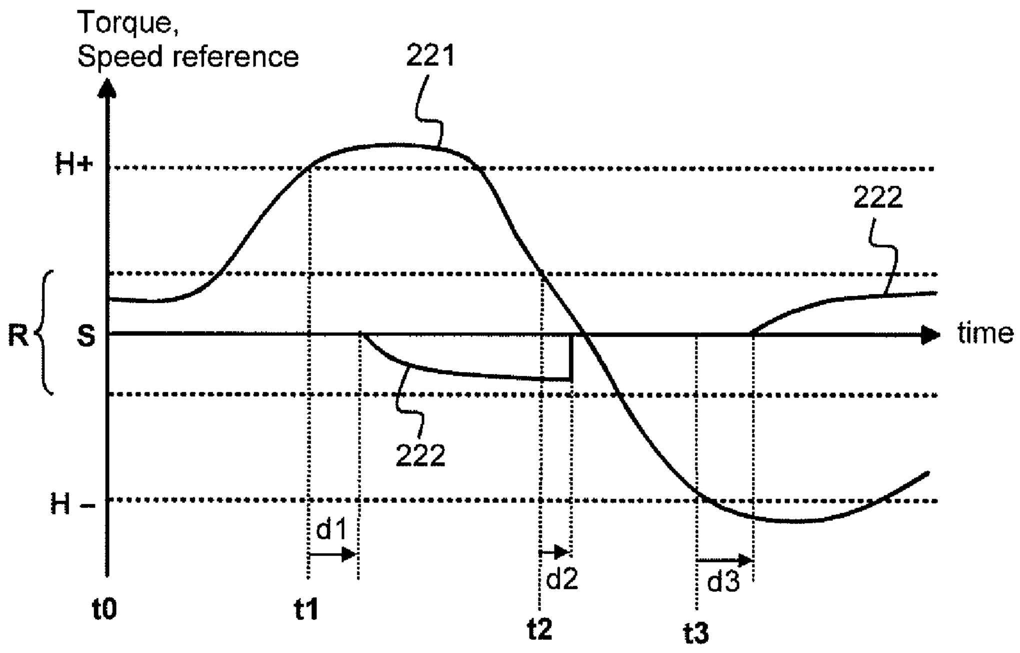

FIG. 3*b* illustrates an operation of mooring winches according to exemplary embodiments of the disclosure in exemplifying situations. The curve 221 represents the torque estimate, and the curve 222 represents a speed reference of the AC motor. Note that the speed reference 222 coincides with the time-axis during time intervals t0 . . . t1+d1 and t2+d2 . . . t3+d3.

In a mooring winch according to an exemplary embodiment of the present disclosure, the control unit 105 (FIG. 1) is configured to make the AC current motor 103 (FIG. 1) wind the mooring rope 102 (FIG. 1) in as a response to a situation in which a first pre-determined delay d3 has elapsed after the torque estimate 221 went below the hysteresis limit value H−, and make the AC motor 103 wind the mooring rope out as a response to a situation in which a second pre-determined delay d1 has elapsed after the torque estimate 221 exceeded the hysteresis limit value H+. In the exemplifying situation shown in FIG. 3*b*, the torque estimate exceeds the hysteresis limit value H+ at the time instant t1 and thus the speed reference 222 is made negative after the delay d1 in order to reduce the mooring rope tension. At the time instant t3, the torque estimate goes below the hysteresis limit value H− and thus the speed reference is made positive after the delay d3 in order to increase the mooring rope tension. With the aid of the these delays, it is possible to avoid unnecessary, and possibly oscillating, control actions, for example, in a situation in which the torque estimate 221 oscillates around one of the said hysteresis limits H+ and H−.

In a mooring winch according to an exemplary embodiment of the present disclosure, the control unit 105 (FIG. 1) is configured to set the speed reference 222 to zero as a response to a situation in which a pre-determined delay d2 has elapsed after the torque estimate 221 entered the pre-determined range R. In the exemplifying situation shown in FIG. 3*a*, the estimated torque 221 gets into the pre-determined range R at the time instant t2 and thus the speed reference 222 is set to zero at the time instant t2+d2.

In a mooring winch according to an exemplary embodiment of the present disclosure, the control unit 105 (FIG. 1) is configured to constitute a speed controller for controlling the rotational speed of the alternating current motor 103 (FIG. 1). An output of the speed controller is a target value of torque that can vary over time. The pre-determined set value S of torque can be an upper limit for the target value of torque, for example.

A method according to an exemplary embodiment of the present disclosure includes a selection between the above-described periodical mooring operation and the continuous mooring operation.

In a method according to an exemplary embodiment of the present disclosure, the AC motor 103 is controlled to wind the mooring rope in as a response to a situation in which the torque estimate 221 (FIG. 3*a*) goes below a first pre-determined limit value H−(FIG. 3*a*), and the AC motor 103 is controlled to wind the mooring rope out as a response to a situation in which the torque estimate 221 (FIG. 3*a*) exceeds a second pre-determined limit value H+(FIG. 3*a*), the second pre-determined limit value being greater than the first pre-determined limit value.

In a method according to an exemplary embodiment of the present disclosure, a reference value 222 (FIG. 3*a*) of rotational speed of the AC motor 103 is set to zero as a response to a situation in which the torque estimate 221 (FIG. 3*a*) is within a pre-determined range R (FIG. 3*a*), the pre-determined range being around a pre-determined set value S (FIG. 3*a*) of torque.

In a method according to an exemplary embodiment of the present disclosure, the AC motor 103 is controlled to wind the mooring rope 102 in as a response to a situation in which a first pre-determined delay d3 (FIG. 3*b*) has elapsed after the torque estimate 221 (FIG. 3*b*) went below the first predetermined limit value H−(FIG. 3*b*), and the AC motor 103 is controlled to wind the mooring rope 102 out as a response to a situation in which a second predetermined delay d1 (FIG. 3*b*) has elapsed after the torque estimate 221 (FIG. 3*b*) exceeded the second pre-determined limit value H+(FIG. 3*b*), where the second pre-determined limit value is greater than the first pre-determined limit value.

In a method according to an exemplary embodiment of the present disclosure, the reference value 222 (FIG. 3*b*) of rotational speed of the AC motor 103 is set to zero as a response to a situation in which a pre-determined delay d2 (FIG. 3*b*) has elapsed after the torque estimate 221 (FIG. 3*b*) entered a pre-determined range R, the pre-determined range being around a predetermined set value S (FIG. 3*b*) of torque.

In a method according to an exemplary embodiment of the present disclosure, the pre-determined set value S (FIGS. 3*a* and 3*b*) of torque is an upper limit for a target value of torque, the target value of torque being an output of a speed controller configured to control the rotational speed of the AC motor 103.

An exemplary embodiment of the present disclosure provides a non-transitory computer-readable recording medium having a computer program recorded thereon that causes a processor of a computing device (e.g., a general purpose computer) executing the computer program to perform operations according to any one of the above-described exemplary embodiments. As used herein, the term "computer-readable recording medium" is used to connote a non-transitory medium having a computer program or computer-readable instructions recorded thereon. For example, the computer-readable recording medium can be a non-volatile memory such as a ROM, hard disk drive, flash memory, optical memory such as an optical compact disc read only memory (CD-ROM), etc. The computer program recorded on the non-transitory computer-readable recording medium includes computer executable instructions for controlling the mooring rope tension of a mooring winch that includes a winding drum for winding a mooring rope, an AC motor configured to drive the winding drum, and a frequency conversion unit configured to supply electrical power to the alternating current motor. The above-mentioned computer executable instructions are capable of controlling a programmable processor to:

compute a flux space vector for modelling a stator flux of the AC motor, compute a torque estimate on the basis of the flux space vector and a space vector of stator currents of the AC motor, use the torque estimate as an indicator for tension of the mooring rope, and control the frequency conversion unit on the basis of the indicator for the tension of the mooring rope.

The specific examples provided in the description given above should not be construed as limiting. Therefore, the disclosure is not limited merely to the embodiments described above, many variants being possible.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A mooring winch comprising:

a winding drum configured to wind a mooring rope;

a brake;

an AC motor configured to drive the winding drum;

a frequency conversion unit configured to supply electrical power to the AC motor; and a control unit configured to control the frequency conversion unit based on an indicator for tension of the mooring rope, wherein the control unit is configured to set a reference value of rotational speed of the AC motor to a predetermined value, release the brake of the mooring winch, drive the AC motor in one direction for a predetermined time interval, define a first value of a torque of the AC motor, drive the AC motor in an opposite direction for the predetermined interval, define a second value of the torque of the AC motor, and compute a torque estimate using the first and second values of the torque.

2. A mooring winch according to claim 1, comprising:

a sensor configured to measure the tension of the rope, wherein the control unit is configured to receive the measured tension of the rope as an input thereto.

3. A mooring winch according to claim 1, wherein the control unit is configured to:

compute a flux space vector for modelling a stator flux of the AC motor; and compute the first and second values of the torque based on the flux space vector and a space vector of stator currents of the AC motor.

4. A mooring winch according to claim 1, comprising:

a speed measuring device configured to measure the speed of the motor, wherein the control unit is configured to receive the measured speed as an input thereto.

5. A mooring winch according to claim 1, wherein the control unit is configured to:

make the AC motor wind the mooring rope in as a response to a situation in which the torque estimate goes below a first pre-determined limit value; and make the AC motor wind the mooring rope out as a response to a situation in which the torque estimate exceeds a second pre-determined limit value, the second pre-determined limit value being greater than the first predetermined limit value.

6. A mooring winch according to claim 1, wherein the control unit is configured to:

make the AC motor wind the mooring rope in as a response to a situation in which a first pre-determined delay has elapsed after the torque estimate goes below a first pre-determined limit value; and make the AC motor wind the mooring rope out as a response to a situation in which a second pre-determined delay has elapsed after the torque estimate exceeds a second pre-determined limit value, the second pre-determined limit value being greater than the first pre-determined limit value.

7. A mooring winch according to claim 1, wherein the control unit is configured to carry out the following successive phases for accomplishing a periodical mooring operation:

conditional phase A: controlling the AC motor to wind the mooring rope in as a response to a situation in which the computed torque estimate is lower than a first limit value;

conditional phase B: controlling the AC motor to wind the mooring rope out as a response to a situation in which the computed torque estimate is higher than a second limit value; and phase C: waiting a predetermined time interval, re-computing the torque estimate, and continuing from the conditional phase A.

8. A method for controlling the mooring rope tension of a mooring winch, wherein the mooring winch includes a brake, a winding drum for winding a mooring rope, an AC motor configured to drive the winding drum, and a frequency conversion unit configured to supply electrical power to the AC motor, wherein the method comprises:

controlling the frequency conversion unit based on an indicator for tension of the mooring rope;

setting a reference value of rotational speed of the AC motor to a predetermined value;

releasing the brake of the mooring winch;

driving the AC motor in one direction for a predetermined time interval;

defining a first value of a torque of the AC motor;

driving the AC motor in an opposite direction for another predetermined time interval;

defining a second value of the torque of the motor; and computing a torque estimate using the first and second values of the torque.

9. A method according to claim 8, comprising:

computing a flux space vector for modelling a stator flux of the AC motor; and computing the first and second values of the torque based on the flux space vector and a space vector of stator currents of the AC motor.

10. A method according to claim 8, comprising:

controlling the AC motor to wind the mooring rope in as a response to a situation in which the torque estimate goes below a first pre-determined limit value; and controlling the AC motor to wind the mooring rope out as a response to a situation in which the torque estimate exceeds a second pre-determined limit value, the second pre-determined limit value being greater than the first predetermined limit value.

11. A method according to claim 8, comprising:

controlling the AC motor to wind the mooring rope in as a response to a situation in which a first pre-determined delay has elapsed after the torque estimate goes below a first pre-determined limit value; and controlling the AC motor to wind the mooring rope out as a response to a situation in which a second pre-determined delay has elapsed after the torque estimate exceeds a second pre-determined limit value, the second predetermined limit value being greater than the first pre-determined limit value.

12. A method according to claim 8, wherein the method comprises the following successive phases for accomplishing a periodical mooring operation:

conditional phase A: controlling the AC motor to wind the mooring rope in as a response to a situation in which the computed torque estimate is lower than a first limit value;

conditional phase B: controlling the AC motor to wind the mooring rope out as a response to a situation in which the computed torque estimate is higher than a second limit value; and phase C: waiting a predetermined time interval, re-computing the torque estimate and continuing from the conditional phase A.

13. A non-transitory computer-readable recording medium having a computer program recorded thereon that causes a processor of a computing device to control the mooring rope tension of a mooring winch, wherein the mooring winch includes a break, a winding drum for winding a mooring rope, an AC motor configured to drive the winding drum, and a frequency conversion unit configured to supply electrical power to the AC motor, wherein the computer program causes the processor of the computing device to execute operations comprising:

controlling the frequency conversion unit based on an indicator for tension of the mooring rope;

setting a reference value of rotational speed of the AC motor to a predetermined value;

releasing the brake of the mooring winch;

driving the AC motor in one direction for a predetermined time interval;

defining a first value of a torque of the AC motor;

driving the AC motor in an opposite direction for the predetermined interval;

defining a second value of the torque of the AC motor; and computing a torque estimate using the first and second values of the torque.

14. A non-transitory computer-readable recording medium according to claim 13, wherein the program causes the processor of the computing device to execute operations comprising:

computing a flux space vector for modelling a stator flux of the AC motor; and computing the first and second values of the torque based on the flux space vector and a space vector of stator currents of the AC motor.

15. A non-transitory computer-readable recording medium according to claim 13, wherein the program causes the processor of the computing device to execute operations comprising:

controlling the AC motor to wind the mooring rope in as a response to a situation in which the torque estimate goes below a first pre-determined limit value; and controlling the AC motor to wind the mooring rope out as a response to a situation in which the torque estimate exceeds a second pre-determined limit value, the second pre-determined limit value being greater than the first predetermined limit value.

16. A non-transitory computer-readable recording medium according to claim 13, wherein the program causes the processor of the computing device to execute operations comprising:

controlling the AC motor to wind the mooring rope in as a response to a situation in which a first pre-determined delay has elapsed after the torque estimate goes below a first pre-determined limit value; and controlling the AC motor to wind the mooring rope out as a response to a situation in which a second pre-determined delay has elapsed after the torque estimate exceeds a second pre-determined limit value, the second predetermined limit value being greater than the first pre-determined limit value.

17. A non-transitory computer-readable recording medium according to claim 13, wherein the program causes the processor of the computing device to execute the following successive phases for accomplishing a periodical mooring operation:

conditional phase A: controlling the AC motor to wind the mooring rope in as a response to a situation in which the computed torque estimate is lower than a first limit value;

conditional phase B: controlling the AC motor to wind the mooring rope out as a response to a situation in which the computed torque estimate is higher than a second limit value; and phase C: waiting a predetermined time interval, re-computing the torque estimate and continuing from the conditional phase A.

* * * * *